(12) United States Patent
Lientz (10) Patent No.: US 9,015,416 B2
(45) Date of Patent: *Apr. 21, 2015

(54) EFFICIENT CACHE VALIDATION AND CONTENT RETRIEVAL IN A CONTENT DELIVERY NETWORK

(71) Applicant: EdgeCast Networks, Inc., Santa Monica, CA (US)

(72) Inventor: Andrew Lientz, Bellevue, WA (US)

(73) Assignee: Edgecast Networks, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/337,056

(22) Filed: Jul. 21, 2014

(65) Prior Publication Data

US 2014/0330924 A1  Nov. 6, 2014

Related U.S. Application Data

(63) Continuation of application No. 13/632,983, filed on Oct. 1, 2012, now Pat. No. 8,868,834.

(51) Int. Cl.
| | |
|---|---|
| *G06F 12/16* | (2006.01) |
| *G06F 15/167* | (2006.01) |
| *G06F 15/173* | (2006.01) |
| *G06F 11/14* | (2006.01) |
| *H04L 29/08* | (2006.01) |
| *G06F 12/08* | (2006.01) |
| *G06F 17/30* | (2006.01) |

(52) U.S. Cl.
CPC ........ *G06F 11/1464* (2013.01); *H04L 67/2842* (2013.01); *H04L 67/06* (2013.01); *G06F 12/0813* (2013.01); *G06F 12/0875* (2013.01); *G06F 17/30132* (2013.01); *G06F 17/30902* (2013.01); *H04L 67/1097* (2013.01)

(58) Field of Classification Search
USPC .......... 711/119, 124, 141, 144; 709/214, 216, 709/219
See application file for complete search history.

(56) References Cited

U.S. PATENT DOCUMENTS

| | | | |
|---|---|---|---|
| 6,865,737 B1 | 3/2005 | Lucas et al. | |
| 7,373,654 B1 | 5/2008 | Reid | |
| 2004/0019669 A1 | 1/2004 | Viswanath et al. | |
| 2006/0143432 A1* | 6/2006 | Rothman et al. | 713/2 |
| 2007/0156392 A1 | 7/2007 | Balchandran et al. | |
| 2008/0082809 A1* | 4/2008 | Rothman et al. | 713/1 |
| 2008/0307513 A1* | 12/2008 | Chow et al. | 726/5 |
| 2011/0258700 A1* | 10/2011 | Chow et al. | 726/22 |
| 2012/0158831 A1* | 6/2012 | Beaver et al. | 709/203 |
| 2013/0073813 A1* | 3/2013 | Bacik | 711/144 |
| 2014/0053227 A1* | 2/2014 | Ruppin et al. | 726/1 |

* cited by examiner

*Primary Examiner* — John Lane (57) ABSTRACT

Some embodiments provide systems and methods for validating cached content based on changes in the content instead of an expiration interval. One method involves caching content and a first checksum in response to a first request for that content. The caching produces a cached instance of the content representative of a form of the content at the time of caching. The first checksum identifies the cached instance. In response to receiving a second request for the content, the method submits a request for a second checksum representing a current instance of the content and a request for the current instance. Upon receiving the second checksum, the method serves the cached instance of the content when the first checksum matches the second checksum and serves the current instance of the content upon completion of the transfer of the current instance when the first checksum does not match the second checksum.

20 Claims, 6 Drawing Sheets

EFFICIENT CACHE VALIDATION AND CONTENT RETRIEVAL IN A CONTENT DELIVERY NETWORK

CLAIM OF BENEFIT TO RELATED APPLICATIONS

This application is a continuation of non-provisional patent application Ser. No. 13/632,983, entitled "Efficient Cache Validation and Content Retrieval in a Content Delivery Network", filed Oct. 1, 2012. The contents of application Ser. No. 13/632,983 are hereby incorporated by reference.

TECHNICAL FIELD

The present invention relates to content caching and content delivery networks.

BACKGROUND ART

Content delivery networks (CDNs) have greatly improved the way content is transferred across data networks such as the Internet. One way a CDN accelerates the delivery of content is to reduce the distance that content travels in order to reach a destination. To do so, the CDN strategically locates surrogate origin servers, also referred to as caching servers or edge servers, at various points-of-presence (PoPs) that are geographically proximate to large numbers of end users and the CDN utilizes a traffic management system to route requests for content hosted by the CDN to the caching server that can optimally deliver the requested content to the requesting end user. As used hereafter optimal delivery of content refers to the most efficient available means with which content can be delivered from a server to an end user machine over a data network. Optimal delivery of content can be quantified in terms of latency, jitter, packet loss, distance, and overall end user experience.

Determination of the optimal caching server may be based on geographic proximity to the requesting end user as well as other factors such as load, capacity, and responsiveness of the caching servers. The optimal caching server delivers the requested content to the requesting end user in a manner that is more efficient than when origin servers of the content provider deliver the requested content. For example, a CDN may locate caching servers in Los Angeles, Dallas, and New York. These caching servers may cache content that is published by a particular content provider with an origin server in Miami. When a requesting end user in San Francisco submits a request for the published content, the CDN will deliver the content from the Los Angeles caching server on behalf of the content provider as opposed to the much greater distance that would be required when delivering the content from the origin server in Miami. In this manner, the CDN reduces the latency, jitter, and amount of buffering that is experienced by the requesting end user. The CDN also allows the content provider to offload infrastructure costs, configuration management, and maintenance to the CDN while being able to rapidly scale resources as needed. Content providers can therefore devote more time to the creation of content and less time to the creation of an infrastructure that delivers the created content to the end users. As a result of these and other benefits, many different CDNs are in operation today. Edgecast, Akamai, Limelight, and CDNetworks are some examples of operating CDNs.

A continual goal of any CDN is to improve the speed by which the CDN delivers content on behalf of its content provider customers. The obvious manner with which to improve CDN performance is by scaling the CDN resources. For example, the CDN can deploy additional PoPs to locate more edge servers closer to different groups of end users. Similarly, the CDN can deploy more expensive solid state disks (SSDs) in its caching servers instead of less expensive magnetic disk in order to improve responsiveness of its caching servers. However, the tradeoff for improved CDN performance by increasing resources is the increased cost associated with deploying said resources. Also, resource scaling provides diminishing returns on infrastructural investments once the CDN reaches a certain size.

To avoid these costs, CDN operators look for ways to derive improved performance out of already deployed resources. Content caching is a particular area of focus. For instance, improvements to how and what content is cached can directly translate to improved CDN performance. Such improvements can yield a more efficient usage of the CDN's finite cache, resulting in more content being served from cache as opposed to the greater delays that are associated with retrieving and serving content from a more distant origin server. Accordingly, there is a need for more efficient techniques with which to cache content at the CDN edge servers as well as to maintain, validate, and serve such cached content.

SUMMARY OF THE INVENTION

Some embodiments implement systems and methods that improve the efficiency by which caching servers of a distributed system perform cache validation, cache filling, and caching of dynamic content. To realize these improvements, some embodiments modify caching server behavior to deviate from standard Time-To-Live (TTL) cache controls. TTL cache controls dictate that a caching server is to replace an instance of cached content with a fresh instance when the TTL parameter associated with the cached content expires (hereafter "TTL-expired content"). However, the modified caching server behavior advocated herein preserves the TTL-expired content in cache and serves the TTL-expired content to a requesting end user when freshness of the cached content can be validated using means that are more expedient to receiving a fresh instance of the content from an origin or surrogate origin.

In some such systems and methods, when a caching server caches content, the caching server also stores a validation checksum. The validation checksum identifies a specific instance of the content. Different instances of particular content represent various changes that are applied to the content over time. In other words, any change that is made to the particular content results in a different instance and thereby a different validation checksum for the particular content. The validation checksum is thus defined independent of any TTL parameter associated with the particular content.

In some embodiments, the caching server validates TTL-expired cached content by simultaneously requesting (i) a validation checksum for a fresh instance of the cached content as well as (ii) a fresh instance of the cached content from a surrogate origin. In reply, the caching server receives the validation checksum identifying the fresh instance for the cached content. The caching server also contemporaneously begins receiving the fresh instance of the cached content. The caching server compares the validation checksum received for the fresh instance of the content against a validation checksum that the caching server maintains for the cached instance of the TTL-expired content.

When the validation checksums match, the caching server serves the cached instance of the TTL-expired content without waiting for the transfer of the fresh instance of the content to complete. In other words, when the validation checksums match, it is an indication that there is no difference between the cached instance and the fresh instance of the content even though the TTL parameter for the cached instance has expired. In some embodiments, the caching server terminates the transmission of the fresh instance of the content upon validating the cached instance. Additionally, the caching server may update the TTL for the cached instance of the TTL-expired content with the TTL identified for the fresh instance of the content based on one or more incoming packets for the fresh instance that are received before the transmission is terminated.

When the validation checksums do not match, the caching server replaces the cached instance of the TTL-expired content with the fresh instance being transferred. The caching server also stores the validation checksum identifying the fresh instance of the content. The caching server then forwards the fresh instance of the content to a requesting end user as it is received or when the transfer is complete.

From this implementation, the caching server can continue to serve a cached instance of TTL-expired content when the caching server identifies, using the validation checksums, that the content has not changed since the expiration of the TTL parameter. In so doing, content delivery performance of the CDN improves as a result of serving expired but unchanged content from cache when traditional TTL cache controls would otherwise dictate refreshing such content from a more distant origin before being able to serve that content. Also, the determination for whether to serve the cached instance of the TTL-expired content or a fresh instance of the content introduces no additional delay as the determination occurs simultaneously, if not, contemporaneously with the retrieval of the fresh instance of the content. Consequently, the systems and methods allow TTL-expired content to be served from cache while also being revalidated for reuse for another TTL interval when it is known that the TTL-expired content has not changed, wherein such revalidation would ordinarily require retrieving a fresh instance of the content from the more distant origin. CDN performance is improved as a result of invalidating less content from cache and reusing more cached content. These systems and methods also greatly improve the cacheability of dynamic content having a small TTL parameter.

BRIEF DESCRIPTION OF THE DRAWINGS

In order to achieve a better understanding of the nature of the present invention, preferred embodiments for systems and methods that perform the cache validation will now be described, by way of example only, with reference to the accompanying drawings in which.

DETAILED DESCRIPTION

In the following detailed description, numerous details, examples, and embodiments for systems and methods that perform cache validation are set forth and described. As one skilled in the art would understand in light of the present description, these systems and methods are not limited to the embodiments set forth, and these systems and methods may be practiced without some of the specific details and examples discussed. Also, reference is made to the accompanying figures, which illustrate specific embodiments in which the systems and methods can be practiced. It is to be understood that other embodiments can be used and structural changes can be made without departing from the scope of the embodiments herein described.

To aid in the discussion to follow, content is described with reference to one or more instances of that content. The different instances for specific content track the evolution of that specific content with respect to changes made to the specific content over time. For instance, a first instance of specific content may represent a particular website and a second instance of that specific content may represent the same particular website albeit with some altered text or objects. Text, images, video, and other multimedia represent other examples of content that can have different instances.

In some embodiments, different instances of the same content can be uniquely identified by hashing the different instances to produce unique checksums for each instance. The hash may produce the checksum based on a content identifier, such as a Uniform Resource Locator (URL) or content name. The hash may also produce the checksum based on elements that uniquely identify the content itself, such as the content size, resolution, encoding rate, etc. In some embodiments, the checksum is produced using the MD5 hash function, though any hash function can be used.

The term "current instance" or "fresh instance" of content refers to the real-time or most current form of the content. The fresh instance of content is determined by the content provider that originates that content.

The term "cached instance" of content refers to the form of the content at the time a copy of the content is cached. Accordingly, the cached instance of content may be the same or deviate from the current instance or fresh instance of the content.

Figure 1:
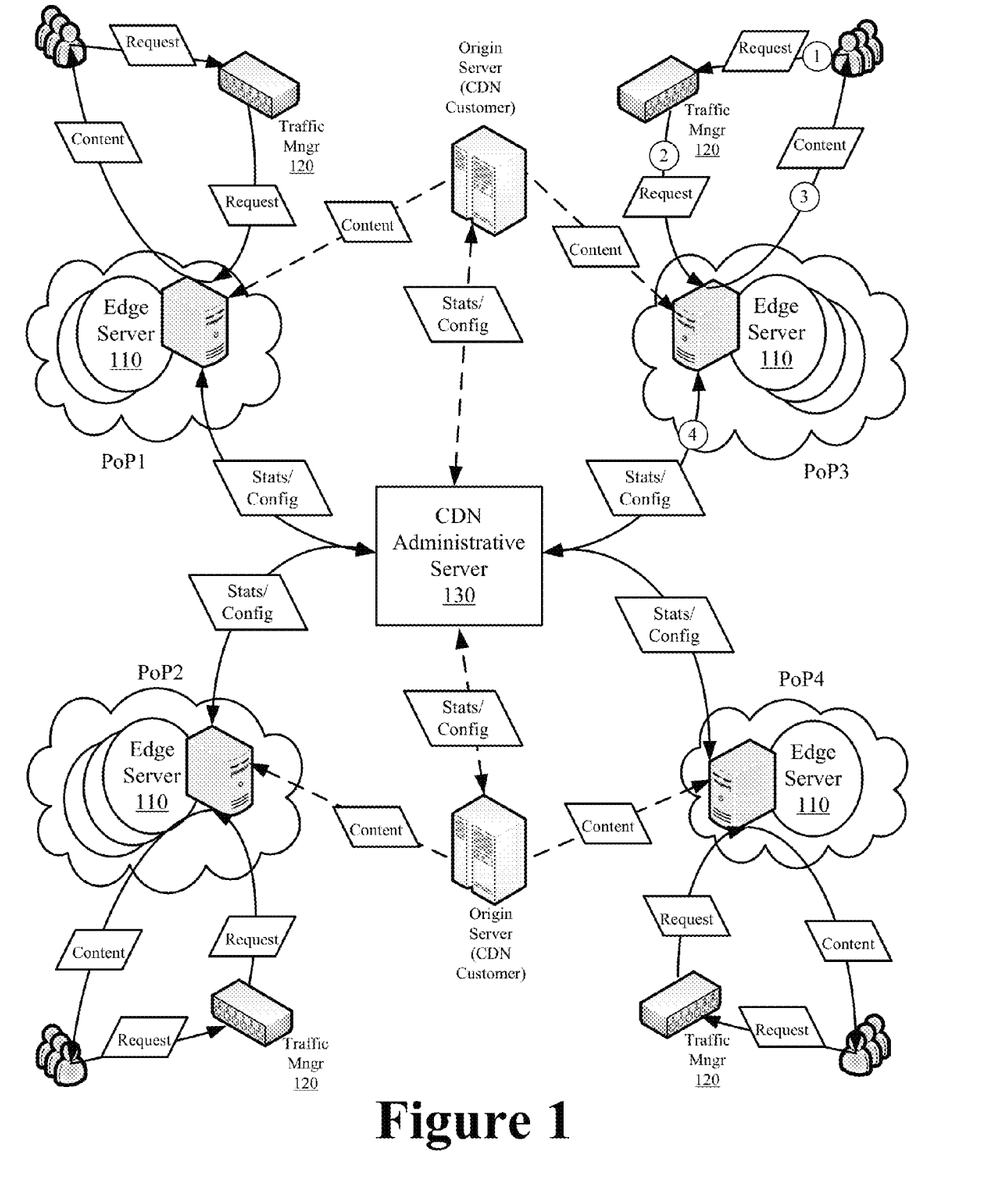
FIG. 1 presents an exemplary CDN architecture to establish a framework for implementing the cache validation systems and methods in accordance with some embodiments.

An overview of an exemplary Content Delivery Network (CDN) architecture is provided with reference to FIG. 1 to establish a framework for implementing the cache validation systems and methods in accordance with some embodiments. As shown in FIG. 1, the CDN includes several different caching Points-of-Presence (PoPs) 110 from which content is locally served to end users, traffic management servers 120, and an administrative server 130. The figure also illustrates the interactions that CDN customers including content providers have with the CDN and interactions that content consumers or end users have with the CDN.

Each PoP may be representative of a server farm for a geographically proximate set of physically separate machines or a set of virtual machines that execute over partitioned sets of resources of one or more physically separate machines. The PoPs are distributed across different network edges of the Internet to facilitate the "last mile" delivery of content. The traffic management servers 120 typically route content requests to the closest PoP in order to download content from the CDN with the goal of reducing the time needed to deliver the content to the end user.

Each edge server of the set of edge servers for a given PoP may represent a single physical machine or a cluster of machines that cache and serve content on behalf of different content providers to end users. An edge server may cache the same content as other edge servers in the same PoP or may be configured to cache different content than the other edge servers in the same PoP. In some embodiments, the edge servers are configured to perform caching according to a two-tier cache hierarchy. The two-tier cache hierarchy is explained in greater detail with reference to FIG. 2 below.

The traffic management servers 120 route end users, and more specifically, end user issued requests for content to one or more edge servers that can optimally deliver the requested content back to the end users. Different CDN implementations utilize different traffic management schemes to achieve such routing to the optimal edge servers. For the purposes of the discussion that is to follow, the traffic management scheme performs Anycast routing to identify a server from the set of servers 110 that can optimally serve requested content to a particular end user requesting the content. However, it should be apparent that other traffic management schemes such as Domain Name System (DNS) routing can be used and that the traffic management servers 120 can include different combinations of DNS servers, load balancers, and routers performing Anycast or Border Gateway Protocol (BGP) routing.

The administrative server 130 may include a central server of the CDN or a distributed set of interoperating servers that perform the configuration control and reporting functionality of the CDN. Content providers register with the administrative server 130 in order to access services and functionality of the CDN. Accordingly, content providers are also referred to as customers of the CDN. Once registered, content providers can interface with the administrative server 130 to specify a configuration, upload content, and view performance reports. The administrative server 130 also aggregates statistics data from each server of the set of edge servers 110 and processes the statistics to produce usage and performance reports. From these reports, the content provider can better understand the demand for its content, the performance provided by the CDN in delivering the content provider's content, and the need for capacity reallocation, among other uses.

Figure 2:
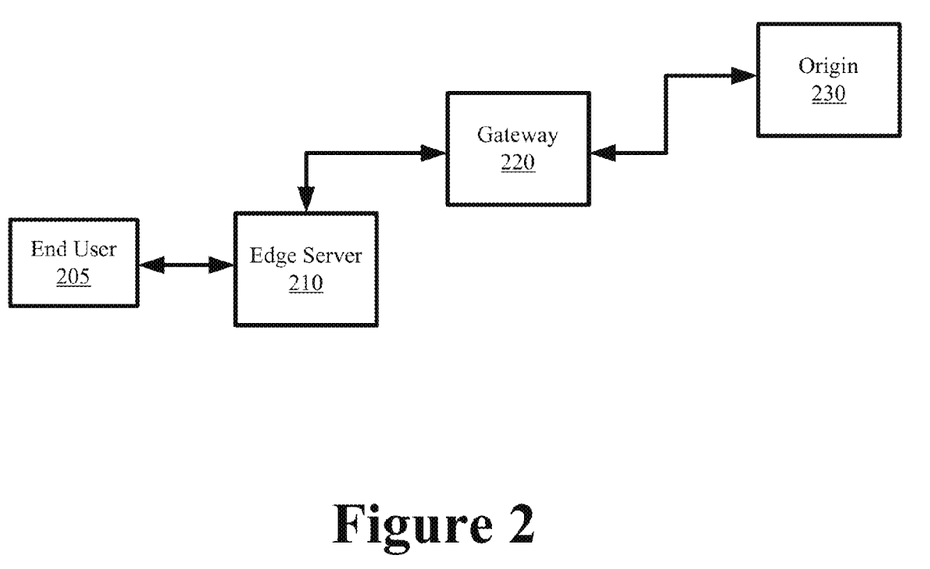
FIG. 2 illustrates the two-tier cache hierarchy in accordance with some embodiments.

FIG. 2 illustrates the two-tier cache hierarchy in accordance with some embodiments. The first tier of the two-tier cache hierarchy is a CDN edge server 210 that receives a content request from the end user 205 and the second tier of the two-tier cache hierarchy is a gateway server 220 of the CDN that operates as a surrogate origin server for the content being requested from the first tier CDN edge server 210.

Any edge server in any PoP can operate as the first tier edge server 210 when that edge server is routed a content request from one or more of the traffic management servers 120. Should the first tier edge server 210 have the requested content cached, the first tier edge server 210 serves that content from cache. However, if the requested content is not cached by the first tier edge server 210, the first tier edge server 210 attempts to retrieve the content from the gateway server 220. In some embodiments, the first tier edge server 210 identifies the correct gateway server 220 based on a hash of the URL for the content being requested.

Should the gateway server 220 have the requested content cached, it provides the content to the first tier edge server 210 and the first tier edge server 210 serves the content to the requesting end user 205. The first tier edge server 210 optionally caches the content received from the gateway server 220. Should the gateway server 220 not have the requested content cached, the gateway server 220 contacts the content provider origin server 230 that originates the content being requested, retrieves the requested content from the origin server 230, and provides the requested content to the first tier edge server 210 for delivery to the requesting end user 205.

In some embodiments, the gateway server 220 is another CDN edge server at another PoP that is located closer to the content provider origin server 230 than the first tier caching server 210. As such, the edge servers in any PoP can operate as either a first tier edge server 210, gateway server 220, or both. In some other embodiments, the gateway server 220 is special purposed CDN server for operating as a surrogate origin.

This two-tier cache hierarchy affords the CDN many benefits. Namely, more traffic is internalized within high-speed pathways of the CDN, cache hit rates are increased relative to a single caching tier, and fewer requests are passed outside the CDN to slower links over which content provider origin servers are accessible. This two-tier cache hierarchy also provides the architecture for implementing the cache validation systems and methods set forth herein. Specifically, each edge server executes a cache validation policy to determine whether cached content has expired and needs to be refreshed with a fresh instance of the content or whether the cached content can be served from cache without being refreshed from the gateway or origin. Ordinarily, the cache validation policy is governed by the Time-To-Live (TTL) parameter. The TTL parameter is a standard IP header field that specifies an interval in which content can be accurately cached and served from cached without worry of the content changing. When the TTL parameter for specific content expires, the cache validation policy causes the edge server to purge the cached instance of the specific content from cache and retrieve a fresh instance of the specific content. However, some embodiments leverage the two-tier cache hierarchy to enable the first tier edge server 210 to serve TTL-expired content by performing a simultaneous validation and refresh of the TTL-expired content with the gateway server 220, wherein the validation can be completed efficiently and independent of the refresh based on checksum values that identify any changes or differences between the cached instance of the TTL-expired content at the first tier edge server 210 and a fresh instance of the content at the gateway server 220.

Figure 3:
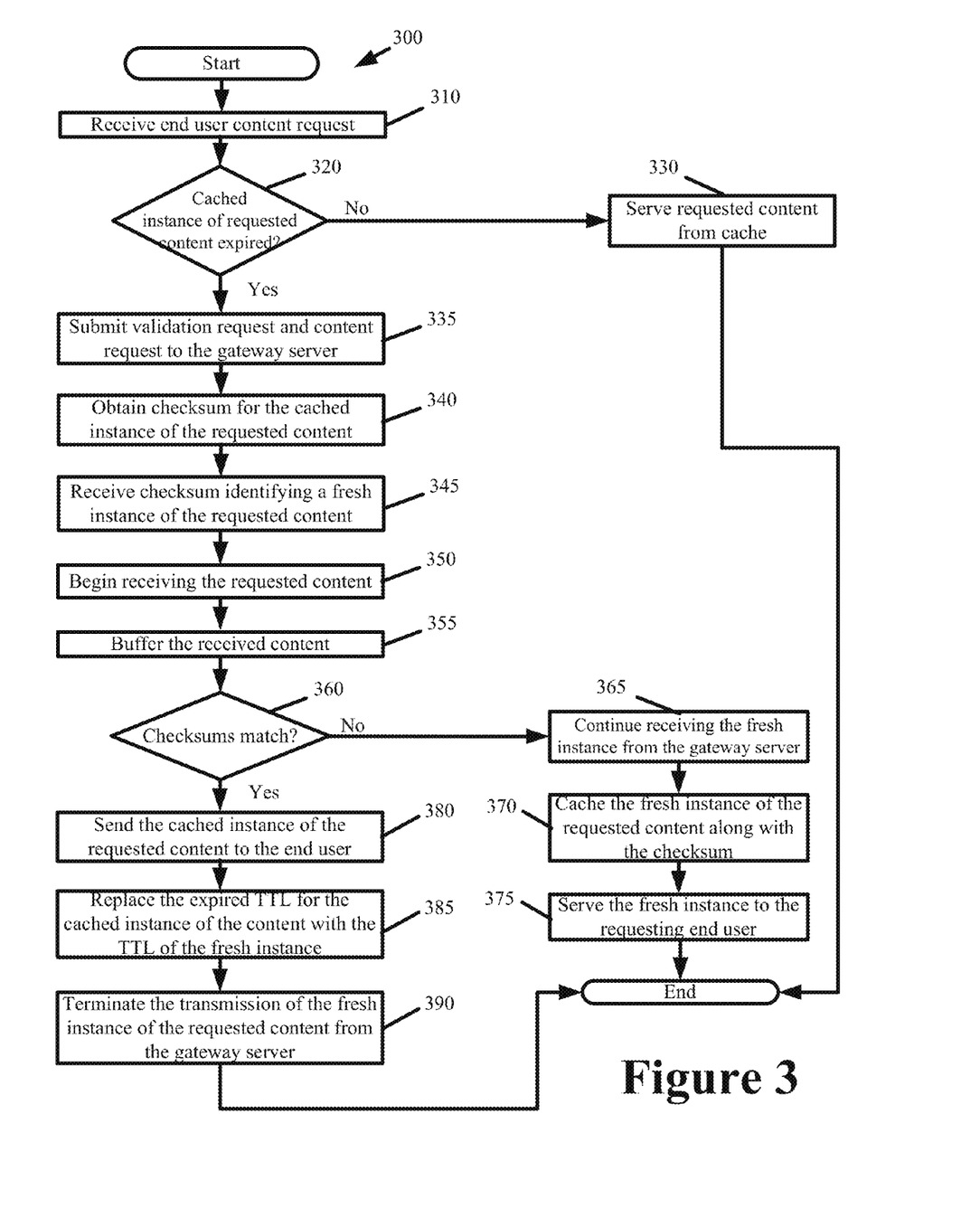
FIG. 3 presents a process describing a first tier CDN edge server performing cache validation in accordance with some embodiments.

FIG. 3 presents a process 300 describing a first tier CDN edge server function in performing cache validation in accordance with some embodiments. The process 300 commences when the first tier CDN edge server receives (at 310) a request for content. The request is typically in the form of a HTTP GET request with a URL identifying the content being requested. However, it should be apparent to one of ordinary skill in the art that the process 300 can be performed using other content request formats that contain other identifiers for the content being requested besides the URL. It is assumed for the remainder of this process 300 that the requested content is present in the CDN edge server cache. However, should the requested content not be in the CDN edge server cache, the server forwards the content request to the gateway server that is designated as the surrogate origin for that content and the CDN edge server continues as per normal CDN edge server operation.

When the requested content is present in the CDN edge server cache, the process checks (at 320) the Time-To-Live (TTL) parameter for the cached instance of the content to determine whether the cached content has expired. When the TTL parameter for the cached instance of the requested content is not expired, the process satisfies the request by serving (at 330) the cached instance of the requested content to the requesting end user.

When the TTL parameter for the cached instance of the requested content has expired, the process submits (at 335) a validation request and the content request to the gateway server that is designated as the surrogate origin for the content being requested. As noted above, the designated gateway server may be identified based on the URL of the content being requested.

In some embodiments, the validation request is a request for the gateway server to provide a checksum for the newest instance of the requested content, wherein the request includes the URL of the content being requested. In some embodiments, the validation request and the content request are submitted as a single message (i.e., single datagram). In some such embodiments, the validation request is contained within the header of the datagram and the content request is contained in the payload of the datagram. In some other embodiments, the validation request and the content request are submitted as separate messages (i.e., multiple datagrams), wherein the separate messages are submitted contemporaneously with one another. In some embodiments, the validation request is identified by setting a flag within a header of an IP, TCP, or HTTP packet. For example, the validation request may be submitted by way of an HTTP eTag.

The process obtains (at 340) a checksum for the cached instance of the requested content while awaiting the gateway server's response. The first tier CDN edge server can compute the checksum for the cached instance of the requested content. However, it is more likely that the first tier CDN edge server will have already stored the checksum for the cached instance. More specifically, the first tier CDN edge server may compute and store the checksum at the time the first tier CDN edge server caches the cached instance of the content. Alternatively, the first tier CDN edge server may receive the checksum as part of the first tier CDN edge server receiving the cached instance of the content from the gateway server. In some embodiments, the first tier CDN edge server maintains a database to store the checksums for all instances of cached content. In some other embodiments, each PoP is configured with a database that stores the checksums for all instances of content cached by any edge server operating in that PoP. The PoP database implementation is especially suited when each edge server of a PoP is configured to cache different content. In such implementations, the first tier CDN edge server retrieves the checksum for the cached instance of the requested content from the PoP database.

Upon receiving either or both of the validation request and the content request, the gateway server may perform a cache fill to obtain a fresh instance of the content from the proper origin. The gateway server then computes the checksum for the fresh instance of the content using a specified hash function. Alternatively, the gateway server may determine that the fresh instance of the content is already in local cache because of a prior request from another edge server or because the gateway server is configured to adhere to traditional cache control policies whereby cached content is automatically refreshed by retrieving the fresh instance of the content from the proper origin upon expiration of the content's TTL parameter. In such cases, the gateway server will have already computed and stored the checksum for the fresh instance when the gateway server receives the either or both of the validation requests and the request for the fresh instance of the content from the first tier CDN edge server. The gateway server responds to the validation request by passing the checksum for the fresh instance of the requested content to the first tier CDN edge server. The gateway server also responds to the request for the fresh instance of the content by passing the fresh instance of the requested content to the first tier CDN edge server.

Preferably, the gateway server passes the checksum in a separate datagram than a first packet encapsulating part of the fresh instance of the requested content. This is done because the checksum can be encapsulated in the header of a single packet such that the packet need not have a payload. As a result, the packet or datagram encapsulating the checksum can be produced and passed sooner than a packet encapsulating part of the requested content, wherein the payload for the packet encapsulated part of the requested content is filled according to a maximum transmit unit.

With reference back to FIG. 3 and in response to the submitted validation request, the process receives (at 345) the checksum identifying the fresh instance of the requested content from the gateway server. The process also receives (at 350) the fresh instance of the requested content from the gateway server. As noted above, since the checksum in response to the validation request is only a single value, the response can be encapsulated in the header of a single datagram such that the datagram payload is empty. As a result, it is likely that the response to the validation request (i.e., the checksum for the fresh instance of the requested content) will arrive at the first tier CDN edge server prior to the first datagram that contains part of the requested content in its payload. The process buffers (at 355) the fresh instance of the requested content as it arrives from the gateway server.

Next, the process compares (at 360) the checksum for the cached instance of the requested content with the checksum for the fresh instance of the requested content that is received from the gateway server. The comparison is an efficient calculation as it merely involves comparing the two checksum values to determine if they are the same or different.

If the checksums do not match, the process continues receiving (at 365) the fresh instance from the gateway server and caches (at 370) the fresh instance of the requested content along with the checksum received in response to the validation request. The process then serves (at 375) the fresh instance of the content to the requesting end user, wherein the fresh instance can be served to the requesting end user as it is received by the first tier CDN edge server or once the transfer to the first tier CDN edge server is complete.

If the checksums match, the process sends (at 380) the cached instance of the requested content to the requesting end user even though the TTL parameter for the cached instance has expired. In some embodiments, the process also replaces (at 385) the expired TTL for the cached instance of the content with the TTL of the fresh instance of the content that is being obtained from the gateway server. Lastly, the process terminates (at 390) the transmission of the fresh instance of the requested content from the gateway server. In some embodiments, terminating the transmission of the fresh instance of the requested content includes closing or resetting the TCP connection over which the content is transmitted.

By serving the TTL-expired content from cache, the process violates standard TTL cache validation controls, but nevertheless ensures that the content being served to the end user is no different than the fresh instance of the content. In so doing, the CDN performance is improved as the first tier CDN edge server can accurately serve the TTL-expired content while avoiding the added latency of first transferring the content from the gateway server to the edge server when adhering to standard TTL cache validation controls. Consequently, the systems and methods advocated herein do not unnecessarily invalidate cached content because of an arbitrary interval. Rather, the cached content is invalidated only when the content is actually changed. By invalidating cache on content changes rather than an arbitrary interval, a CDN greatly increases the cacheability of dynamic content or content that is associated with very small TTL parameters. For instance, frequently requested content that is known to change often can nevertheless be cached and served from cache until the change actually occurs, thereby satisfying a large number of requests that occur in that short interval with greater efficiency.

Figure 4:
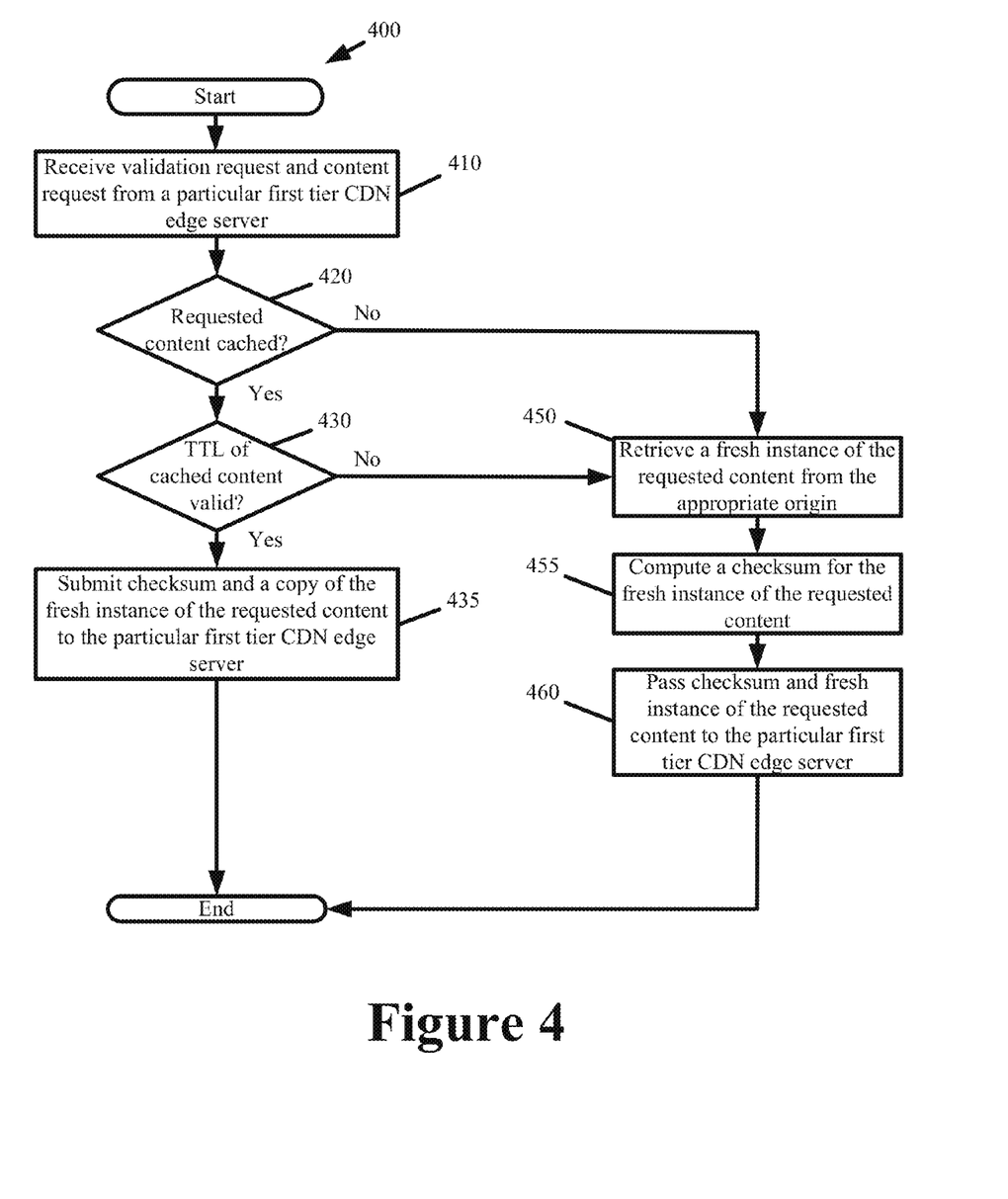
FIG. 4 presents a process describing a gateway server function in performing cache validation in accordance with some embodiments.

FIG. 4 presents a process 400 describing a gateway server function in performing cache validation in accordance with some embodiments. The process 400 commences when the gateway server receives (at 410) the validation request and content request from a particular first tier CDN edge server. The process queries (at 420) local cache of the gateway server to determine if the requested content is cached.

If cached, the process validates (at 430) the cached content based on the TTL parameter that is associated with the cached content. In other words, the gateway server operates according to standard TTL cache controls. In embodiments where the gateway server is another edge server and not a specialized server of the CDN, the gateway server operates according to standard TTL cache controls when it receives a request from another edge server and not an end user or when it receives the validation request. In either case, the gateway server can identify that it is to perform a gateway function for the second tier of the cache hierarchy.

If the freshness of the content is validated on the basis of the TTL parameter associated with the cached content, the process submits (at 435) a computed checksum for the fresh instance of the requested content and a copy of the fresh instance of the requested content to the particular first tier CDN edge server and the process ends. In some embodiments, the gateway server computes the checksum for the fresh instance of the requested content upon receiving the validation request from the first tier CDN edge server. However, it is more likely that the gateway server computes and stores the checksum when it retrieves and caches the fresh instance of the requested content.

If not cached or if the TTL parameter for the content cached at the gateway server has expired, the process retrieves (at 450) a fresh instance of the requested content from the appropriate origin. The process computes (at 455) a checksum for the fresh instance of the requested content. The checksum and fresh instance of the requested content are then passed (at 460) to the particular first tier CDN edge server and the process ends.

Figure 5:
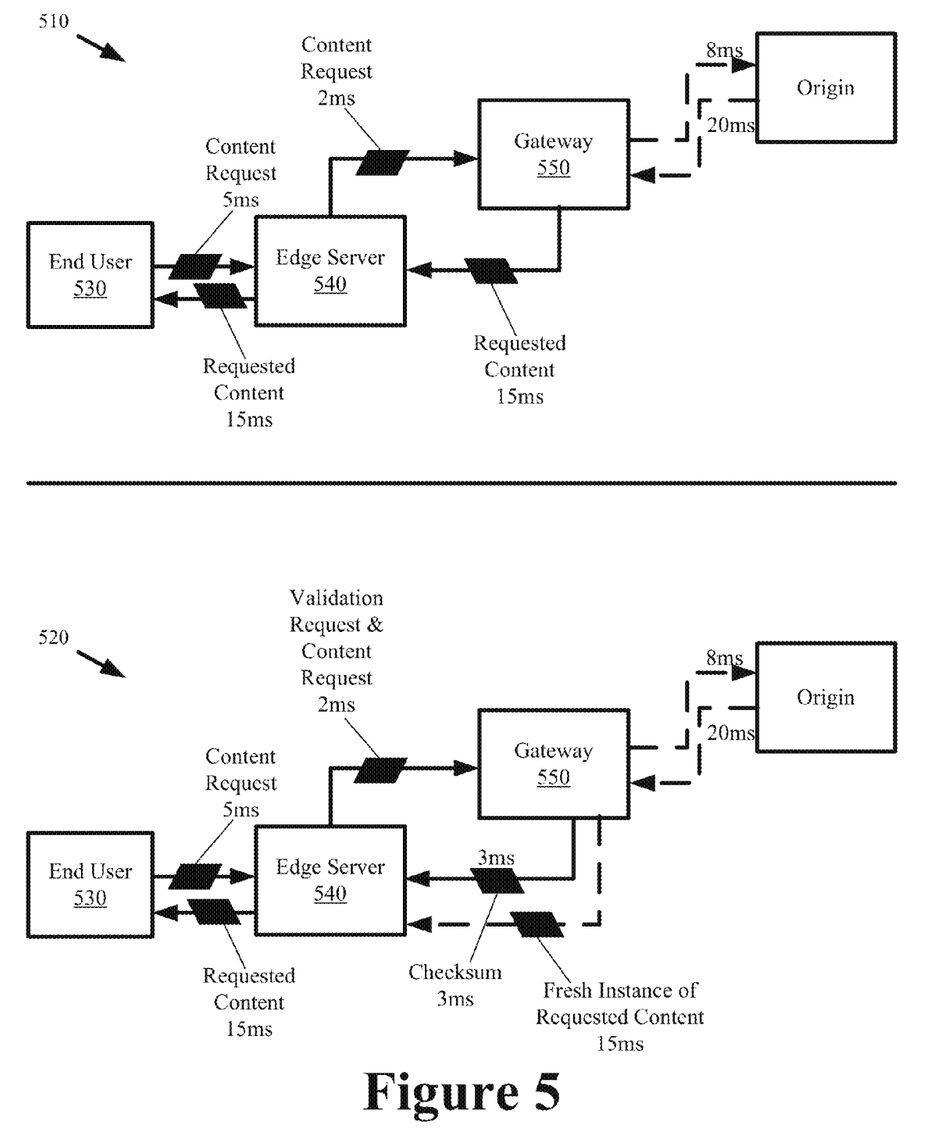
FIG. 5 provides an exemplary illustration for the time it takes a CDN to serve content in response to a request when the CDN operates according to traditional TTL cache controls and when the CDN performs cache validation in accordance with some embodiments.

To demonstrate the advantages of the systems and methods advocated herein, FIG. 5 provides an exemplary illustration for the time it takes a CDN to serve content in response to a request when the CDN operates according to traditional TTL cache controls (scenario 510) and when the CDN performs cache validation in accordance with the embodiments presented herein (scenario 520). FIG. 5 assumes that the content that is served to a requesting end user 530 is cached at a first tier CDN edge server 540 and that the cached content is associated with an expired TTL parameter. In other words, FIG. 5 illustrates the first tier CDN edge servers 540 caching TTL-expired content.

Either scenario begins with the end user 530 submitting a request for content that is routed to the first tier CDN edge server 540. As shown in this figure, it takes 5 milliseconds (ms) for the first tier CDN edge server 540 to receive the end user 530 submitted request.

In scenario 510, the edge server 540 refreshes the expired content in cache by requesting a fresh instance of the content from gateway server 550. The high-speed inter-CDN pathways deliver the request in 2 ms. The gateway server 550 then responds by passing the fresh instance of the requested content to the edge server 540. It takes 15 ms to completely transfer the fresh instance of the requested content to the edge server 540 and another 15 ms to transfer the fresh instance of the requested content to the end user 530. Accordingly, the total roundtrip time to serve the content to the end user 530 according to prior art cache controls is 37 ms (5 ms+2 ms+15 ms+15 ms). This roundtrip time can be even greater should the gateway server 550 have to contact a content provider origin server for the fresh instance of the requested content as a result of not having the fresh instance of the requested content in cache.

In scenario 520, the edge server 540 validates the TTL-expired content by submitting the validation request and the request for the fresh instance of the content to the gateway server 550. Each request is transferred in 2 ms. The gateway server 550 retrieves and passes the checksum for the fresh instance of the requested content in 3 ms while beginning the transfer of the fresh instance of the requested content which was shown in scenario 510 to take 15 ms. Upon receiving the checksum and determining that the checksum of the fresh instance of the requested content matches the checksum of the cached instance of the TTL-expired content cached by the edge server 540, the edge server 540 can begin serving the cached instance of the requested content to the end user 540 without waiting for the transfer of the fresh instance of the requested content from the gateway server 550. In fact, the edge server 540 terminates the transfer to preserve the gateway server 550 resources. Consequently, the total roundtrip to serve the content to the end user 530 when using the two-tier cache hierarchy performing cache validation in accordance with some embodiments is 25 ms (5 ms+2 ms+3 ms+15 ms). As should be evident from FIG. 5, greater benefit is realized when the distance between the first tier edge servers and gateway servers is great or when the distance from the gateway servers to the origin servers is great.

Other advantages of the present implementation result from the minimal overhead needed to compute the checksums. For smaller content, checksums can be computed efficiently with few resources. This is in contrast to the more resource intensive task of ascertaining the differences between two instances of the same content for the purpose of invalidating and refreshing only the changed aspects for the cached instance of content.

However, checksum computation can become a resource intensive task for either the gateway server or the edge server when the content being hashed is of a large file size. In such cases, the process can be streamlined by computing the checksum on a specified partition of the file. For example, rather than compute a checksum for an entire one gigabyte file, the process can be modified to compute the checksum for the first megabyte of the one gigabyte file. Additional checksums can be computed and compared for later partitions of the file, thereby avoiding the need to compute a checksum for the entire content or for all partitions of the content. In continuing with the example, rather than compute a checksum for the entire one gigabyte file, the process can be modified to compute a first checksum for the first megabyte of the file and a second checksum for the last megabyte of the file.

Yet another advantage is to leverage the new cache validation policies to obviate existing purge mechanisms. Specifically, whenever a checksum for a cached instance of content does not match the checksum for a fresh instance of the content, the cached instance is overwritten with the fresh instance of the content and the new checksum is stored, thereby eliminating the need for the edge server to independently scan for content to purge from cache when the TTL parameter associated with the content expires. In other words, a caching no longer needs to periodically scan its cache in order to identify and remove TTL-expired content.

The systems and methods described above rely on a two-tier CDN cache hierarchy for their implementation. This is because concerted action is required by two devices to support the validation requests in violation of traditional TTL cache controls. A CDN operator controls both the CDN edge server and the gateway server and can thus enhance their implementation according to the embodiments described herein. However, various modifications can be made to the above architecture without loss of functionality.

One such modified architecture involves using an end user client (e.g., browser) in conjunction with a first tier CDN edge server. In this modified architecture, the end user client is modified to retain TTL-expired content in cache and a checksum for that content. When the end user client wishes to use the TTL-expired cached content, the client submits a validation request to the first tier CDN edge server. The first tier CDN edge server responds by submitting a checksum for a fresh instance of the content as well as by submitting the fresh instance of the content. The end user client then compares the checksums to determine whether the content has changed. If not, the client uses the cached content without waiting for the transfer of the content from the edge server to complete. The client can also terminate the transfer of the fresh instance of the content. In such embodiments, the end user client operates according to process 300 and the first tier CDN edge server operates according to process 400.

Another modified architecture involves using a CDN gateway server in conjunction with a content provider origin server. In this modified architecture, the gateway server is modified to retain TTL-expired content in cache and a checksum for that content. When the gateway server wishes to use the TTL-expired cached content, the gateway server submits a validation request to the origin server of the content provider that originates the content. The origin server responds by submitting a checksum for a fresh instance of the content as well as by submitting the fresh instance of the content. The gateway server then compares the checksums to determine whether the content has changed. If not, the gateway server uses the cached content without waiting for the transfer of the content from the origin server to complete. In such embodiments, the gateway server operates according to process 300 and the origin server operates according to process 400.

Many of the above-described processes are implemented as software processes that are specified as a set of instructions recorded on non-transitory computer readable storage medium (also referred to as computer readable medium). When these instructions are executed by one or more computational element(s) (such as processors or other computational elements like ASICs and FPGAs), they cause the computational element(s) to perform the actions indicated in the instructions. More specifically, when the instructions are executed, they transform a computer system with general computing resources into a specialized edge server or gateway server that does not adhere to standard TTL cache controls but that nonetheless realizes better content delivery performance for the CDN utilizing such devices.

Server, computer system, and computing machine are meant in their broadest sense and may include any electronic device with a processor that executes instructions stored on computer readable media or that are obtained remotely over a network connection. Examples of computer readable media include, but are not limited to, CD-ROMs, flash drives, RAM chips, hard drives, EPROMs, etc. Further, wherever a server is identified as a component of the embodied invention, it is understood that the server may be a single physical machine, or a cluster of multiple physical machines performing related functions, or virtualized servers co-resident on a single physical machine, or various combinations of the above.

Figure 6:
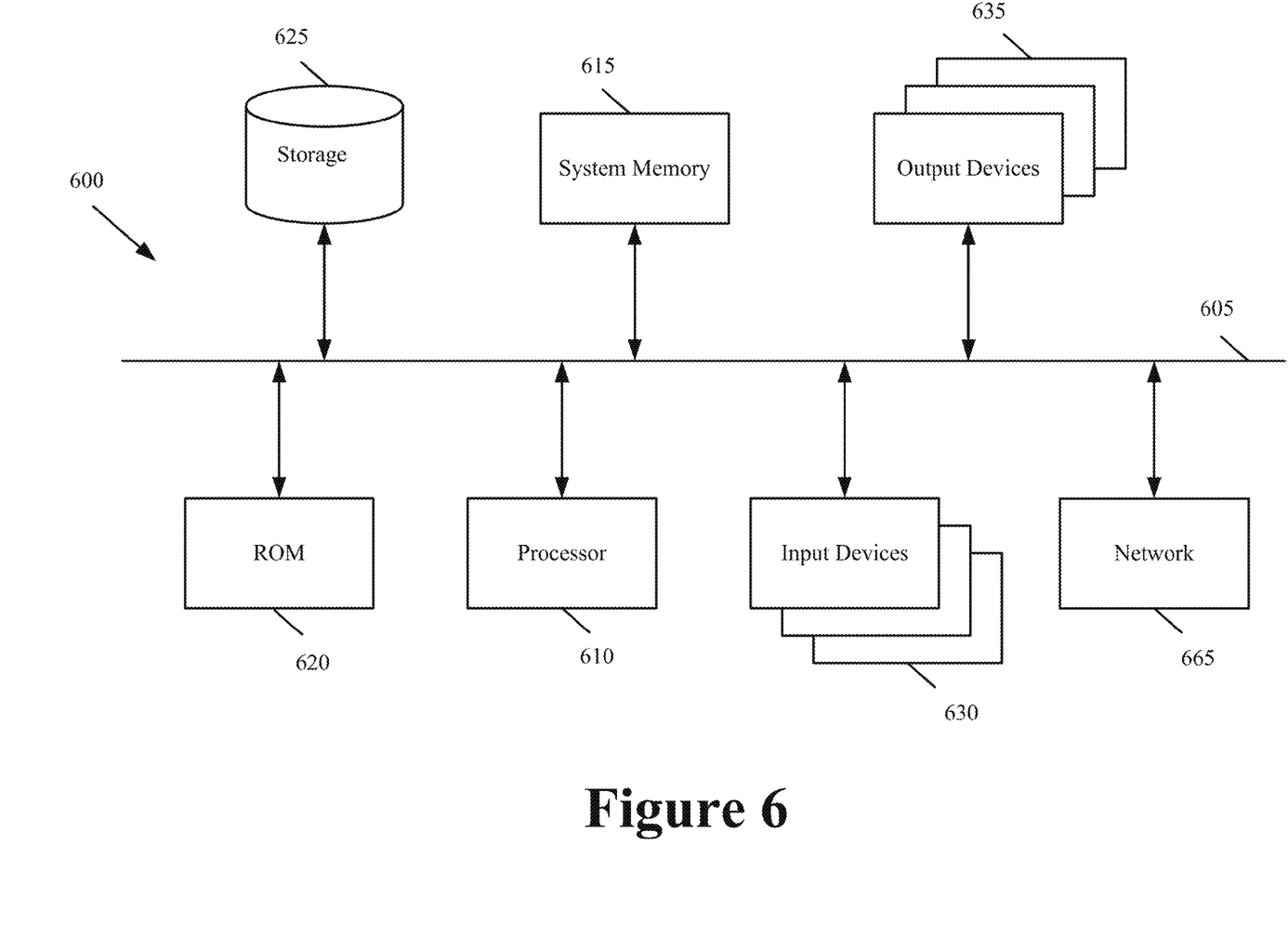
FIG. 6 illustrates a computer system or server with which some embodiments are implemented.

FIG. 6 illustrates a computer system or server with which some embodiments are implemented. Such a computer system includes various types of computer readable mediums and interfaces for various other types of computer-readable mediums that implement the processes for the cache validation systems and methods described above (e.g., first tier CDN edge server and gateway server). Computer system 600 includes a bus 605, a processor 610, a system memory 615, a read-only memory 620, a permanent storage device 625, input devices 630, and output devices 635.

The bus 605 collectively represents all system, peripheral, and chipset buses that communicatively connect the numerous internal devices of the computer system 600. For instance, the bus 605 communicatively connects the processor 610 with the read-only memory 620, the system memory 615, and the permanent storage device 625. From these various memory units, the processor 610 retrieves instructions to execute and data to process in order to execute the processes of the invention. The processor 610 is a processing device such as a central processing unit, integrated circuit, graphical processing unit, etc.

The read-only-memory (ROM) 620 stores static data and instructions that are needed by the processor 610 and other modules of the computer system. The permanent storage device 625, on the other hand, is a read-and-write memory device. This device is a non-volatile memory unit that stores instructions and data even when the computer system 600 is off. Some embodiments of the invention use a mass-storage device (such as a magnetic or optical disk and its corresponding disk drive) as the permanent storage device 625.

Other embodiments use a removable storage device (such as a flash drive) as the permanent storage device Like the permanent storage device 625, the system memory 615 is a read-and-write memory device. However, unlike the storage device 625, the system memory is a volatile read-and-write memory, such as random access memory (RAM). The system memory stores some of the instructions and data that the processor needs at runtime. In some embodiments, the processes are stored in the system memory 615, the permanent storage device 625, and/or the read-only memory 620.

The bus 605 also connects to the input and output devices 630 and 635. The input devices enable the user to communicate information and select commands to the computer system. The input devices 630 include, but are not limited to, alphanumeric keypads (including physical keyboards and touchscreen keyboards) and pointing devices (also called "cursor control devices"). The input devices 630 also include audio input devices (e.g., microphones, MIDI musical instruments, etc.). The output devices 635 display images generated by the computer system. The output devices include, but are not limited to, printers and display devices, such as cathode ray tubes (CRT) or liquid crystal displays (LCD).

Finally, as shown in FIG. 6, bus 605 also couples computer 600 to a network 665 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 600 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A computer-implemented method comprising:
storing a first checksum identifying a cached instance of particular content;
receiving a first request for the particular content;
submitting a second request to an external source that remotely hosts a fresh instance of the particular content, wherein the fresh instance of the particular content is representative of a most recent version of the particular content;
receiving from the external source, a second checksum identifying the fresh instance of the particular content contemporaneous with commencement of a transfer of the fresh instance of the particular content from the external source;
serving responsive to the first request, the cached instance of the particular content that is locally cached without reference to said transfer from the external source of the fresh instance of the particular content when the first checksum matches the second checksum; and
serving responsive to the first request, the fresh instance of the particular content after or contemporaneous with said transfer of the fresh instance of the particular content from the external source when the first checksum differs from the second checksum.

2. The computer-implemented method of claim 1 further comprising replacing the cached instance of the particular content in local cache with the fresh instance of the particular content when the first checksum differs from the second checksum.

3. The computer-implemented method of claim 1 further comprising terminating the transfer of the fresh instance of the particular content from the external source when the first checksum matches the second checksum.

4. The computer-implemented method of claim 3 further comprising retaining the cached instance of the particular content in local cache when the first checksum matches the second checksum.

5. The computer-implemented method of claim 4 further comprising resetting an expiration parameter for the cached instance of the particular content when the first checksum matches the second checksum.

6. The computer-implemented method of claim 1 further comprising setting a time-to-live (TTL) parameter for the cached instance of the particular content.

7. The computer-implemented method of claim 6 further comprising serving responsive to the first request, the cached instance of the particular content without submitting the second request to the external source when the TTL parameter has not expired.

8. The computer-implemented method of claim 6 further comprising requesting the second checksum from the external source upon expiration of the TTL parameter.

9. The computer-implemented method of claim 8 further comprising resetting the TTL parameter upon expiration of the TTL parameter without invalidating the cached instance of the particular content when the first checksum matches the second checksum.

10. The computer-implemented method of claim 8 further comprising replacing the cached instance of the particular content with the fresh instance of the particular content upon expiration of the TTL parameter and the first checksum differing from the second checksum.

11. The computer-implemented method of claim 1, wherein submitting the second request comprises passing (i) a first packet requesting the second checksum and (ii) a second packet requesting the fresh instance of the particular content.

12. The computer-implemented method of claim 1, wherein submitting the second request comprises passing a message with a header field set to request the second checksum and a payload comprising an identifier for requesting the fresh instance of the particular content.

13. A computer-implemented method performed by a machine having a processor, the computer-implemented method comprising:
storing a cached instance of particular content with an expiration parameter and a first checksum derived from a hash of the cached instance of the particular content;
requesting from a remote source at expiration of the expiration parameter, a second checksum that is derived from a hash of a fresh instance of the particular content that is stored by the remote source;
receiving the second checksum from the remote source;
retaining the cached instance of the particular content upon expiration of the expiration parameter and the first checksum matching the second checksum; and
replacing the cached instance of the particular content with the fresh instance of the particular content, an expiration parameter for the fresh instance of the particular content, and the second checksum upon expiration of the expiration parameter and the first checksum differing from the second checksum.

14. The computer-implemented method of claim 13, wherein retaining the cached instance of the particular content comprises resetting the expiration parameter for the cached instance of the particular content.

15. The computer-implemented method of claim 13 further comprising requesting from the remote source at expiration of the expiration parameter, the fresh instance of the particular content contemporaneous with requesting the second checksum.

16. The computer-implemented method of claim 15 further comprising (i) commencing transfer of the fresh instance of the particular content upon expiration of the expiration parameter by receiving at least one packet encoding part of the fresh instance of the particular content from the remote source, (ii) terminating said transfer when the first checksum matches the second checksum, and (iii) completing said transfer when the first checksum differs from the second checksum.

17. The computer-implemented method of claim 13, wherein receiving the second checksum from the remote source comprises receiving (i) a first packet comprising no payload and a header specifying the second checksum and (ii) a second packet with a payload encoding an initial portion of the fresh instance of the particular content.

18. The computer-implemented method of claim 13, wherein receiving the second checksum from the remote source comprises receiving a first packet comprising a header specifying the second checksum and a payload encoding an initial part of the fresh instance of the particular content.

19. A system comprising:
   a first storage tier comprising:
      an interface receiving a most current instance of specific content;
      a processor producing a first checksum for the most current instance of the specific content based on a hash of the most current instance of the specific content; and
      a storage maintaining the most current instance of the specific content and the first checksum derived for that most current instance of the specific content;
   a second storage tier comprising:
      an interface communicably coupling the second storage tier to the first storage tier;
      a storage caching a cached instance of the specific content, an expiration parameter, and a second checksum that is derived from a hash of the cached instance of the specific content; and
      a processor validating the cached instance of the specific content upon expiration of the expiration parameter by (i) obtaining the first checksum for the most current instance of the specific content through said second storage tier interface, (ii) retaining the cached instance of the specific content and resetting the expiration parameter when the first checksum matches the second checksum, and (iii) replacing the cached instance of the specific content with the most current instance of the specific content from the first storage tier and the second checksum with the first checksum when the first checksum differs from the second checksum.

20. The system of claim 19, wherein the second storage tier processor responds to a request for the specific content received over the second storage tier interface (i) by serving the cached instance of the specific content when the expiration parameter has not expired or the first checksum matches the second checksum and (ii) by forwarding the most current instance of the specific content from the first storage tier to a requesting user when the expiration parameter has expired and the first checksum does not match the second checksum.

* * * * *